Oct. 27, 1931.  C. H. KIRBY  1,828,899
CARBURATION SYSTEM
Filed Aug. 12, 1929  3 Sheets-Sheet 1
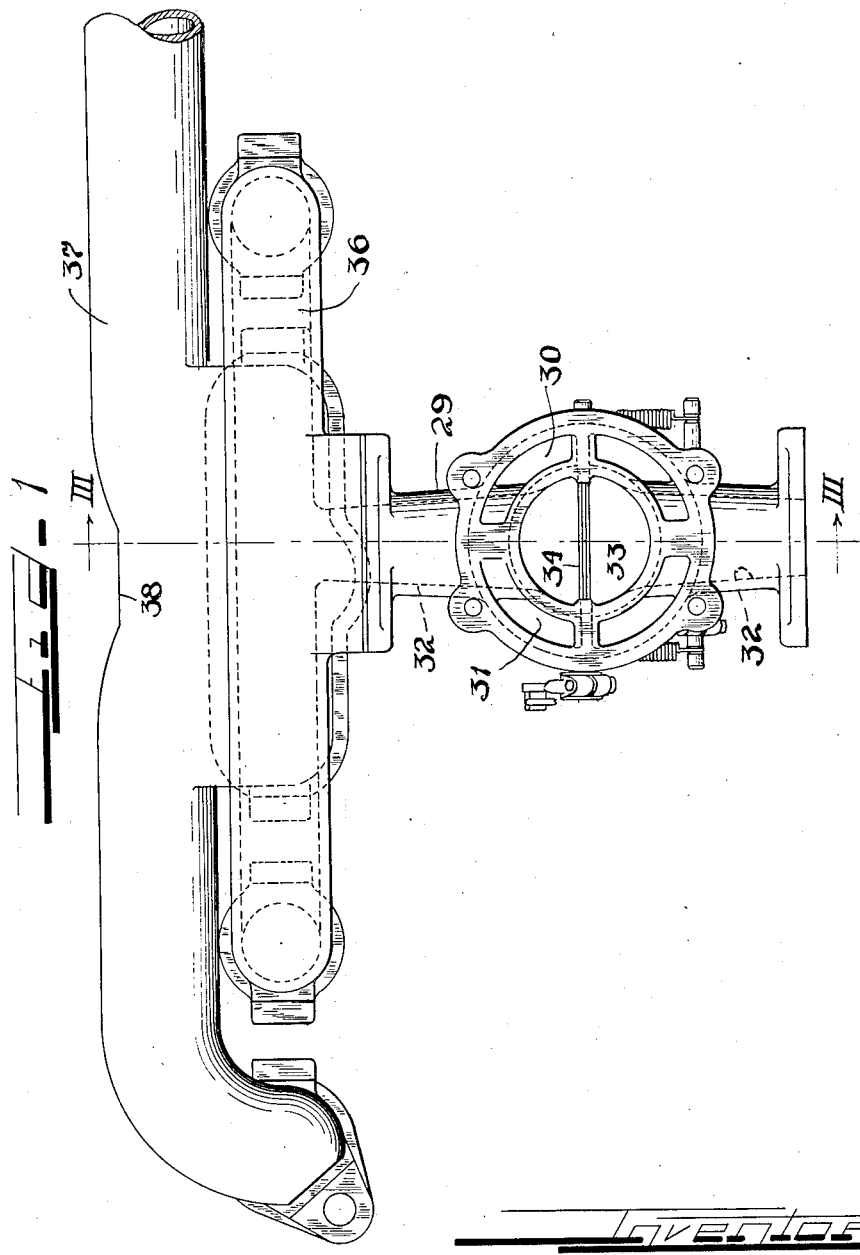
Inventor
Charles H. Kirby Oct. 27, 1931.  C. H. KIRBY  1,828,899
CARBURATION SYSTEM
Filed Aug. 12, 1929  3 Sheets-Sheet 2
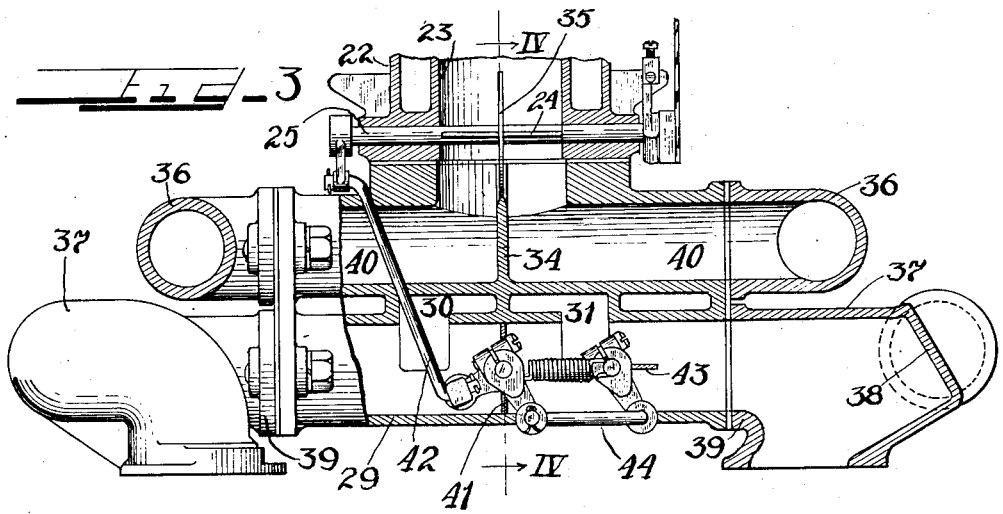
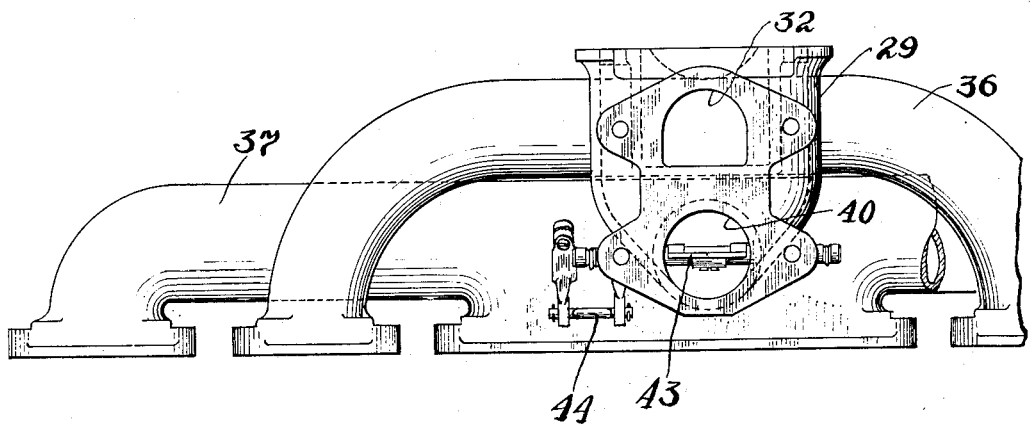
Inventor
Charles H. Kirby

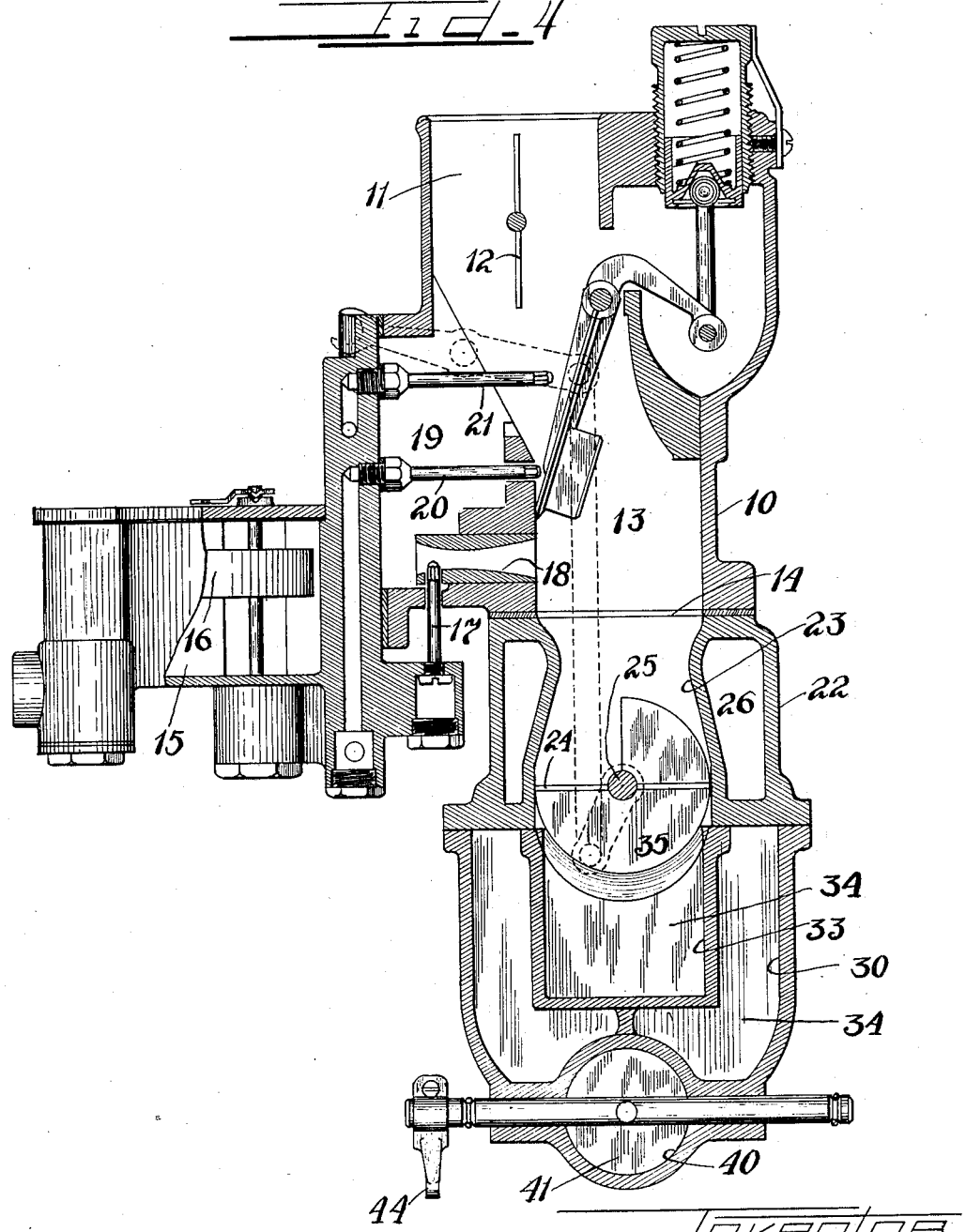

Patented Oct. 27, 1931

1,828,899

UNITED STATES PATENT OFFICE

CHARLES H. KIRBY, OF FLINT, MICHIGAN, ASSIGNOR TO MARVEL CARBURETER COMPANY, OF FLINT, MICHIGAN, A CORPORATION OF ILLINOIS

CARBURATION SYSTEM

Application filed August 12, 1929. Serial No. 385,381.

This invention relates to a carburation system for internal combustion engines and has special reference to a down draft type of carburetor as applied to a V type of engine although the broader aspects of the invention are applicable to multicylinder engines which may be divided into groups of cylinders which have suction and exhaust impulses which alternate between the groups of cylinders.

It is accordingly an object of this invention to provide an improved and simplified carburation system of the type described wherein a single down draft carbureter is adapted to supply groups of cylinders having alternating suction impulses by the provision of means for suppressing the surging effect due to the alternating suction impulses which would otherwise introduce problems of mixture distribution due to positive and negative accelerations of the mixture flow in different branches of the intake manifold.

It is another object of the invention to provide an improved and simplified carburation system for engines of the class described wherein the supply of heat, necessary to secure smooth operation under varying operating conditions, is automatically varied in accordance with the requirements of the engine.

It is a further object of this invention to provide a simple and reliable carburation system for engines of the type described that will be simple and inexpensive to manufacture and service and that will provide an automatic control of the heat supplied to the carbureted mixture to produce the maximum power of the engine.

On the drawings:

Figure 1 is a plan view, with part omitted, of a manifolding system embodying the features of the invention.

Figure 2 is an end view of Figure 1.

Figure 3 is a section on the line III—III of Figure 1.

Figure 4 is a section on the line IV—IV of Figure 3 showing the down draft carbureter in position relative to the manifold.

As shown on the drawings:

The carbureter per se, as shown in Figure 4, is the subject matter of a copending application Serial No. 367,211 filed May 31, 1929, and is therefore shown with some details omitted, since it is the general combination that is the subject matter of the present invention.

The major parts of the carbureter comprise a passaged body 10 having an air inlet passage 11, an air valve 12, and a mixing chamber 13 having a bottom outlet 14. A fuel chamber 15 is shown which contains the usual float 16 and supplies fuel through passages (not shown) leading to a low speed nozzle 17 discharging into a primary venturi 18 which forms part of a bypass passage 19 leading around the air valve location. An intermediate speed nozzle 20 and a high speed nozzle 21 are also shown and are so positioned as to discharge into the air stream flowing past the air valve when the latter is opened to a greater or less extent. The body is mounted on a throttle housing 22 the passage 23 therethrough being formed as a venturi posterior to a throttle disc 24 on a throttle shaft 25. The housing 22 provides an annular heating jacket 26 surrounding the throttle location, which jacket communicates through a series of ports 27 in the upper flange 28 of a box intake heater 29 with separate jackets 30 and 31 each embracing one side outlet 32 of a branched intake header passage 33 which receives the combustible mixture from the carbureter. The passage 33 is divided by a partition 34 which extends adjacent the path of the throttle disc, the throttle being provided with a similar partition 35 which need only cover three fourths of a circle because of the limited throttle movement. The partition 34 also extends between the jackets 30 and 31. The purpose of the partitions 34 and 35 in the intake passage is to prevent a surging flow through the passage 33 when the ends thereof lead to groups of cylinders having alternating suction impulses as such a surging flow would result in an uneven distribution of the combustible mixture with a consequent uneven running of the engine together with an inability to develop the maximum power of the engine.

The side outlets 32 of the intake header passage 33 are connected to individual distributing manifolds 36 for each bank of cylinders in the case of a V type engine; this arrangement locating the carbureter and box intake header centrally of the V with the carbureter above the top of the cylinder blocks, where it is readily accessible.

Each bank of cylinders is provided with an exhaust manifold 37 which is so shaped at 38, in alignment with the box header, as to deflect the exhaust gases towards a flanged connection 39 opening into a corresponding passage in the header leading to the jackets 30 and 31. The alternating exhaust impulses in the manifolds thus cause a surging or back and forth flow of exhaust gases from one manifold to the other, the flow being from one exhaust manifold through the header passage 40 connecting thereto and into the side outlet jacket 30, up into the throttle jacket 26 and thence into the other side outlet jacket 31 and then through the corresponding passage 40 to the other exhaust manifold. This surging or back and forth flow has a frequency proportional to the engine speed, but as the frequency increases the actual displacement of exhaust gases decreases with a corresponding decrease in the heating effect on the intake passages. There is a highly advantageous feature as it is well known that the amount of heat required for the best operating conditions decreases with an increase in engine speed.

It is also advantageous to be able to control the heating effect either manually or in proportion to the throttle opening inasmuch as for nearly full throttle operation it is desirable to be able to reduce the heating effect as a cooler mixture develops more power. In order to obtain this result the passage 40 is extended straight through from end to end of the header thus bypassing the surging gas flow without diverting it through the jackets 30, 26, and 31. A bypass butterfly valve 41 is positioned in the passage 40 in alignment with the partition 34 and is provided with suitable linkage 42 whereby it is operated in unison with the throttle. Thus when the throttle is closed the bypass valve is closed and the full heating effect of the surging exhaust gas flow is delivered through the jackets 30, 26 and 31. When the throttle is opened the bypass valve is opened to the same extent so that the exhaust gas flow is directly through the passage 40, very little heating effect then being produced in the jackets 30, 26 and 31.

In order to further modulate or control the heat supply a second valve 43 is so positioned in the passage 40, that it can entirely shut off the surging flow of exhaust gases. This valve may be controlled independently of the bypass valve if so desired, although it is shown as connected to the bypass valve by the linkage 44 to be operated in opposition thereto in order that when the bypass valve is closed the control valve will be fully open to permit the maximum flow of heating gases. When the bypass valve has been partially opened to reduce the heating effect, the control valve moves correspondingly towards its closed position to reduce the flow of heating gases thus increasing the effective range of the heating control by reducing the heating effect further than would be possible simply by opening the bypass valve.

In the operation of an engine equipped with the carbureter and manifolding system of this invention the downdraft carbureter has its charge divided by the partitions 34 and 35 to produce the effect of a duplex carbureter. When the engine is idling with a closed throttle the surging flow of exhaust gases will be at its maximum due to the relatively slow periods of reversal, and the bypass valve will be fully closed while the control valve will be fully open. As the throttle is opened the bypass valve also opens and the control valve closes proportionally, so that the decreased time intervals between surges is supplemented by a restriction of the passage as well as the opening of the bypass valve, all three factors combining to increasingly cut down the heating effect of the exhaust gases on the intake manifold passages, first by stopping off the flow of exhaust gases through the most effective parts of the jacket 26, 30 and 31 and second by reducing the volume and extent of flow. When the control valve 43 is fully closed there will be no flow of exhaust gases and the only heating effect will be that due to conduction from the exhaust manifolds.

It will thus be seen that I have invented an improved and simplified carburation system for V type engines wherein the supply of heat to the carbureted mixture will be automatically controlled as a function of the speed and power developed by the engine.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A carburation system for V type internal combustion engines comprising a down draft carbureter having a jacketed throttle location, said throttle carrying a division disc, an intake member having a central inlet connection for said carbureter with a partition member therein in alignment with the throttle disc, side outlet connections in said member, intake manifolds connected to said side outlets, a divided heating jacket for said member communicating with the common throttle jacket, each division thereof being connected to separate exhaust manifolds whereby to obtain a surging flow of gases from one exhaust manifold to the other, a bypass passage directly connecting the divisions of said heating jacket, a valve controlling said bypass passage and a second valve controlling the admission of exhaust gases to said heating jacket.

2. A carburation system for V type internal combustion engines comprising a down draft carbureter having a jacketed throttle location, said throttle carrying a division disc, an intake member having a central inlet connection for said carbureter with a partition member therein in alignment with the throttle disc, side outlet connections in said member, intake manifold connected to said side outlets, a divided heating jacket for said member communicating with the common throttle jacket, each division thereof being connected to separate exhaust manifolds whereby to obtain a surging flow of gases from one exhaust manifold to the other, a bypass passage directly connecting the divisions of said heating jacket, a valve controlling said bypass passage, means connecting said valve to said throttle to be operated thereby and a second valve controlling the admission of exhaust gases to said heating jacket.

3. A carburation system for V type internal combustion engines comprising a down draft carbureter having a jacketed throttle location, said throttle carrying a division disc, an intake member having a central inlet connection for said carbureter with a partition member therein in alignment with the throttle disc, side outlet connections in said member, intake manifolds connected to said side outlets, a divided heating jacket for said member communicating with the common throttle jacket, each division thereof being connected to separate exhaust manifolds whereby to obtain a surging flow of gases from one exhaust manifold to the other, a bypass passage directly connecting the divisions of said heating jacket, a valve controlling said bypass passage, a second valve controlling the admission of exhaust gases to said heating jacket, and means linking said second valve to said first valve to inversely operate said valves.

4. A carburation system for V type internal combustion engines comprising a down draft carbureter having a jacketed throttle location, said throttle carrying a division disc, an intake member having a central inlet connection for said carbureter with a partition member therein in alignment with the throttle disc, side outlet connections in said member, intake manifolds connected to said side outlets, a divided heating jacket for said member communicating with the common throttle jacket, each division thereof being connected to separate exhaust manifolds whereby to obtain a surging flow of gases from one exhaust manifold to the other, a bypass directly connecting the divisions of said heating jacket, a valve controlling said bypass passage, means connecting said valve to the throttle to be operated thereby, a second valve controlling the admission of exhaust gases to said heating jacket, and means linking said second valve to said first valve to inversely operate said valves.

5. In an internal combustion engine comprising separate groupings of cylinders which exhaust alternately, the combination of exhaust manifolds for said groups of cylinders, an exhaust connection between said manifolds adapted to permit an alternating flow of gases therethrough due to the alternate exhaust periods of said cylinder groups, an intake passage associated with said connection for said cylinder groups said intake passage having a down draft carbureter supplying carbureted mixture thereto, partition means in said passage and carbureter for separating the passages for the different cylinder groups, a heating jacket for said intake passage formed as part of said exhaust connection, a bypass passage around said heating jacket and valved means for controlling said bypass passage whereby to to vary the heat supplied to said jacket.

6. In an internal combustion engine comprising separate groupings of cylinders which exhaust alternately, the combination of exhaust manifolds for said groups of cylinders, an exhaust connection between said manifolds adapted to permit an alternating flow of gases therethrough due to the alternate exhaust periods of said cylinder groups, an intake passage associated with said connection for said cylinder groups said intake passage having a down draft carbureter supplying carbureted mixture thereto, partition means in said passage and carbureter for separating the passages for the different cylinder groups, a heating jacket for said intake passage formed as part of said exhaust connection, a bypass passage around said heating jacket, valved means for controlling said bypass passage whereby to vary the heat supplied to said jacket, and means connecting said valved means to the carbureter throttle to be operated in unison therewith.

7. In an internal combustion engine comprising separate groupings of cylinders which exhaust alternately, the combination of exhaust manifolds for said groups of cylinders, an exhaust connection between said manifolds adapted to permit an alternating flow of gases therethrough due to the alternate exhaust periods of said cylinder groups, an intake passage associated with said connection for said cylinder groups said intake passage having a down draft carbureter supplying carbureted mixture thereto partition means in said passage and carbureter for separating the passages for the different cylinder groups, a heating jacket for said intake passage formed as part of said exhaust connection, a bypass passage around said heating jacket and valved means for controlling said bypass passage and exhaust connection whereby to vary the heat supplied to said jacket.

8. In an internal combustion engine comprising separate groupings of cylinders which exhaust alternately, the combinaton of exhaust manifolds for said groups of cylinders, an exhaust connection between said manifolds adapted to permit an alternating flow of gases therethrough due to the alternate exhaust periods of said cylinder groups, an intake passage associated with said connection for said cylinder groups said intake passage having a down draft carbureter supplying carbureted mixture thereto partition means in said passage and carbureter for separating the passages for the different cylinder groups, a heating jacket for said intake passage formed as part of said exhaust connection, a bypass passage around said heating jacket, valved means for controlling said bypass passage and exhaust connection whereby to vary the heat supplied to said jacket, and means connecting said valved means to the carbureter throttle to be operated in unison therewith.

9. In an internal combustion engine in which groups of cylinders exhaust in alternation and have separate intake and exhaust manifolds, an intake header connected between the intake manifolds, a down draft carbureter thereon, a heating jacket for said header connected to said exhaust manifolds whereby an alternating flow of exhaust gases occurs between the exhaust manifolds, partitions in said header jacket adapted to distribute the heating gases over the intake passages in the header and a bypass passage around said partitions to reduce the heating effect of said gases.

10. In an internal combustion engine in which groups of cylinders exhaust in alternation and have separate intake and exhaust manifolds, an intake header connected between the intake manifolds, a down draft carbureter thereon, a heating jacket for said header connected to said exhaust manifolds whereby an alternating flow of exhaust gases occurs between the exhaust manifolds, partitions in said header jacket adapted to distribute the heating gases over the intake passages in the header, a bypass passage around said partition to reduce the heating effect of said gases, and valved means for controlling said bypass passage.

11. In an internal combustion engine in which groups of cylinders exhaust in alternation and have separate intake and exhaust manifolds, an intake header connected between the intake manifolds, a down draft carbureter thereon, a heating jacket for said header connected to said exhaust manifolds whereby an alternating flow of exhaust gases occurs between the exhaust manifolds, partitions in said header jacket adapted to distribute the heating gases over the intake passages in the header, a bypass passage around said partitions to reduce the heating effect of said gases, valved means for controlling said bypass passage and means connecting said valved means to the carbureter throttle to be operated in unison therewith.

12. In an internal combustion engine in which groups of cylinders exhaust in alternation and have separate intake and exhaust manifolds, an intake header connected between the intake manifolds, a down draft carbureter thereon, a heating jacket for said header connected to said exhaust manifolds whereby an alternating flow of exhaust gases occurs between the exhaust manifolds, partitions in said header jacket adapted to distribute the heating effect of said gases and valved means for controlling said bypass passage and the exhaust connection to said header jacket.

13. In an internal combustion engine in which groups of cylinders exhaust in alternation and have separate intake and exhaust manifolds, an intake header connected between the intake manifolds, a down draft carbureter thereon, a heating jacket for said header connected to said exhaust manifolds whereby an alternating flow of exhaust gases occurs between the exhaust manifolds, partitions in said header jacket adapted to distribute the heating gases over the intake passages in the header, a bypass passage around said partitions to reduce the heating effect of said gases, valved means for controlling said bypass passage and the exhaust connection to said header jacket and means connecting said valved means to the carbureter throttle to be operated in unison therewith.

14. The combination with an internal combustion engine having a plurality of exhaust manifolds in which alternating discharges occur, of intake manifolds corresponding to said exhaust manifolds, a common header connected to said intake manifolds and provided with a divided jacket with ports each connected to one of said exhaust manifolds, a carbureter having a jacketed throttle valve the jacket of which forms a connection between the divided jacket of the header, and means for directly connecting the ports connecting to the exhaust manifolds to bypass the gas flow between the exhaust manifolds.

15. The combination with an internal combustion engine having a plurality of exhaust manifolds in which alternating discharges occur, of intake manifolds corresponding to said exhaust manifolds, a common header connected to said intake manifolds and provided with a divided jacket with ports each connected to one of said exhaust manifolds, a carbureter having a jacketed throttle valve the jacket of which forms a connection between the divided jackets of the header, means for directly connecting the ports connecting to the exhaust manifolds to bypass the gas flow between the exhaust manifolds, and means for regulating the bypass means.

16. The combination with an internal combustion engine having a plurality of exhaust manifolds in which alternating discharges occur, of intake manifolds corresponding to said exhaust manifolds, a common header connected to said intake manifolds and provided with a divided jacket with ports each connected to one of said exhaust manifolds, a carbureter having a jacketed throttle valve the jacket of which forms a connection between the divided jackets of the header, means for directly connecting the ports connecting to the exhaust manifolds to bypass the gas flow between the exhaust manifolds, and means for regulating the bypass and the flow of gases between the exhaust manifolds.

17. The combination with an internal combustion engine having a plurality of exhaust manifolds in which alternating discharges occur, or intake manifolds corresponding to said exhaust manifolds, a common header connected to said intake manifolds and provided with a divided jacket with ports each connected to one of said exhaust manifolds, a carbureter having a jacketed throttle valve the jacket of which forms a connection between the divided jacket of the header, means for directly connecting the ports connecting to the exhaust manifolds to bypass the gas flow between the exhaust manifolds, control means for said bypass means, and means for operating said control means from the carbureter throttle.

18. The combination with an internal combustion engine having a plurality of exhaust manifolds in which alternating discharges occur, of intake manifolds corresponding to said exhaust manifolds, a common header connected to said intake manifolds and provided with a divided jacket with ports each connected to one of said exhaust manifolds, a carbureter having a jacketed throttle valve the jacket of which forms a connection between the divided jacket of the header, means for directly connecting the ports connecting to the exhaust manifolds to bypass the gas flow between the exhaust manifolds, and control means for regulating the flow of gases between the exhaust manifolds.

19. The combination with an internal combustion engine having a plurality of exhaust manifolds in which alternating discharges occur, or intake manifolds corresponding to said exhaust manifolds, a common header connected to said intake manifolds and provided with a divided jacket with ports each connected to one of said exhaust manifolds, a carbureter having a jacketed throttle valve the jacket of which forms a connection between the divided jacket of the header, means for directly connecting the ports connecting to the exhaust manifolds to bypass the gas flow between the exhaust manifolds, control means for regulating the flow of gases between the exhaust manifolds, and means for operating said control means from the carbureter throttle.

20. The combination with an internal combustion engine having a plurality of exhaust manifolds in which alternating discharges occur, of intake manifolds corresponding to said exhaust manifolds, a common header connected to said intake manifolds and provided with a divided jacket with ports each connected to one of said exhaust manifolds, a carbureter having a jacketed throttle valve the jacket of which forms a connection between the divided jacket of the header, means for directly connecting the ports connecting to the exhaust manifolds to bypass the gas flow between the exhaust manifolds, and valved means for regulating the bypassing and volume of flow of gases between the exhaust manifolds.

In testimony whereof I have hereunto subscribed my name at Flint, Genesee County, Michigan.

CHARLES H. KIRBY.